Jan. 22, 1957 R. P. MUCCILLI 2,778,918
HOT WATER HEATER AND STORAGE TANK
Filed Jan. 20, 1955 2 Sheets-Sheet 1

INVENTOR.
RAPHAEL P. MUCCILLI
BY
L. S. Saulsbury
ATTORNEY

Jan. 22, 1957    R. P. MUCCILLI    2,778,918
HOT WATER HEATER AND STORAGE TANK
Filed Jan. 20, 1955    2 Sheets-Sheet 2
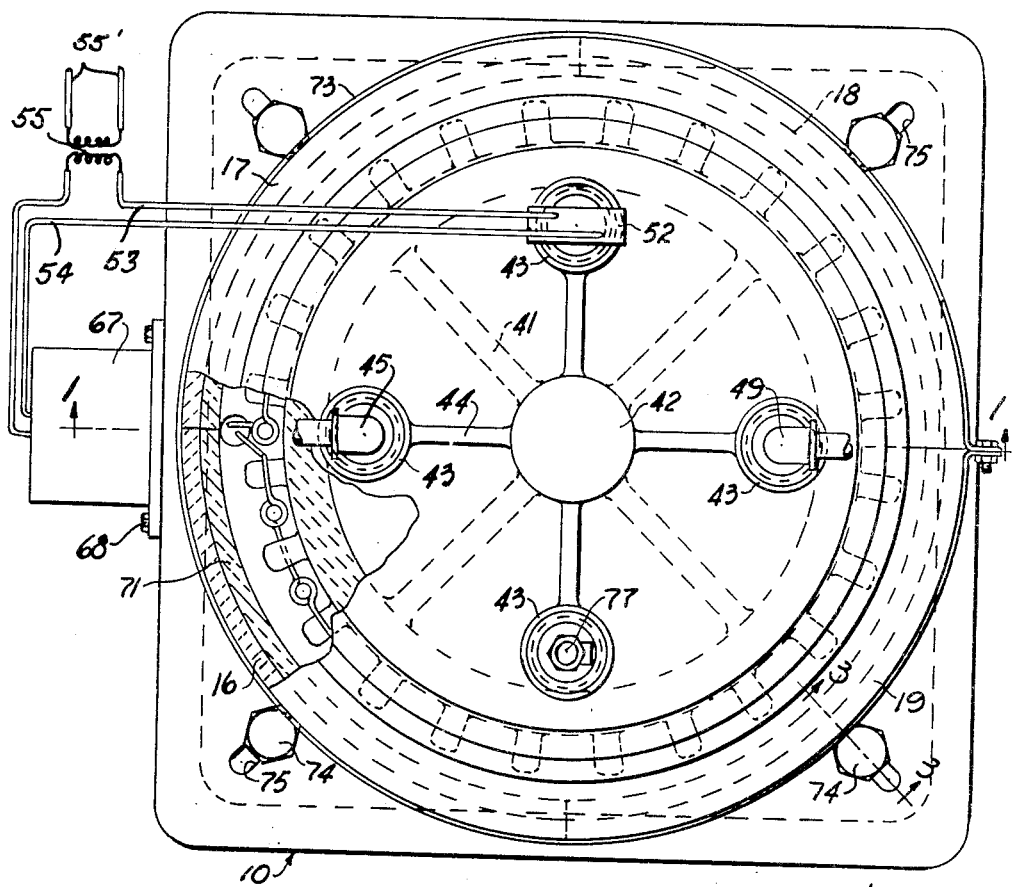
Fig. 2.
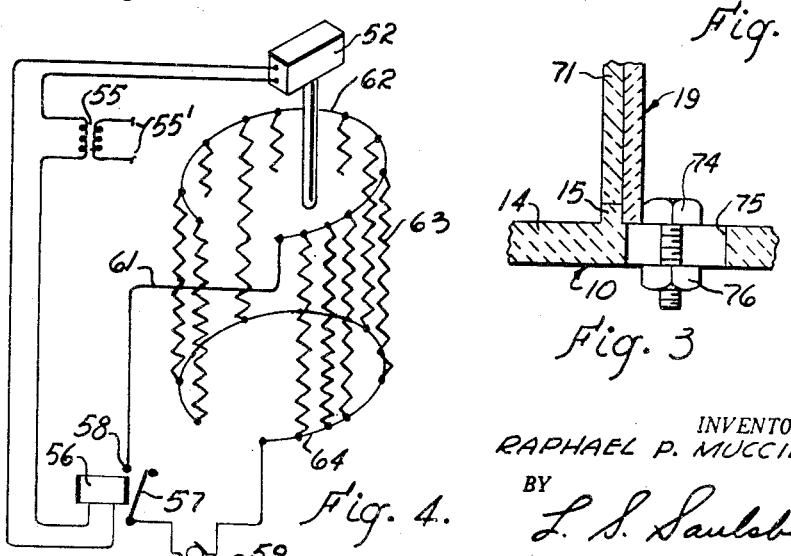
Fig. 3
Fig. 4.
INVENTOR.
RAPHAEL P. MUCCILLI
BY
L. S. Saulsbury
ATTORNEY

2,778,918
HOT WATER HEATER AND STORAGE TANK

Raphael P. Muccilli, New York, N. Y.

Application January 20, 1955, Serial No. 483,042

6 Claims. (Cl. 219—38)

This invention relates to electric hot water heaters and storage tanks therefor.

It is an object of the present invention to provide an electric hot water heater and storage tank formed of glazed ceramic block material serving as insulation for the heater and for the electric heating units surrounding the same.

It is another object of the invention to provide an electric hot water heater which is self-insulated and wherein the heating coils are out of contact with the water.

It is another object of the invention to provide a hot water heater that will not be subjected to rust and which will have long life.

It is another object of the invention to provide an electric hot water heater wherein the heat loss is kept to a minimum and the heat derived from the electric elements are enclosed and insulated to maintain about the assembled parts a maximum of heat.

It is a still further object of the invention to provide a hot water heater and storage tank which can be shipped and stored in a break-down condition and assembled on the premises where the installation is to be made.

Still further objects of the invention are to provide an electric hot water heater and storage tank formed of ceramic material, which is of simple construction, has interchangeable parts, easy to make water-tight, inexpensive to manufacture, has easy access to the heating elements, compact, of pleasing appearance, effective and efficient in use.

For still further objects and for a better understanding of the invention, reference may be had to the following detailed description taken in connection with the accompanying drawing, in which:

Fig. 2 is a top plan view of the heater with a portion of the same broken away to show the arrangement of the electric heating elements and showing the means for retaining the outer shells about the heating elements;

Fig. 3 is an enlarged fragmentary vertical sectional view taken on line 3—3 of Fig. 2 and looking upon the adjustable nut means serving to hold the casings about the heating elements and located in the corners of the base member;

Fig. 4 is a wiring diagram of the electric heating and temperature control circuits.

Figure 1:
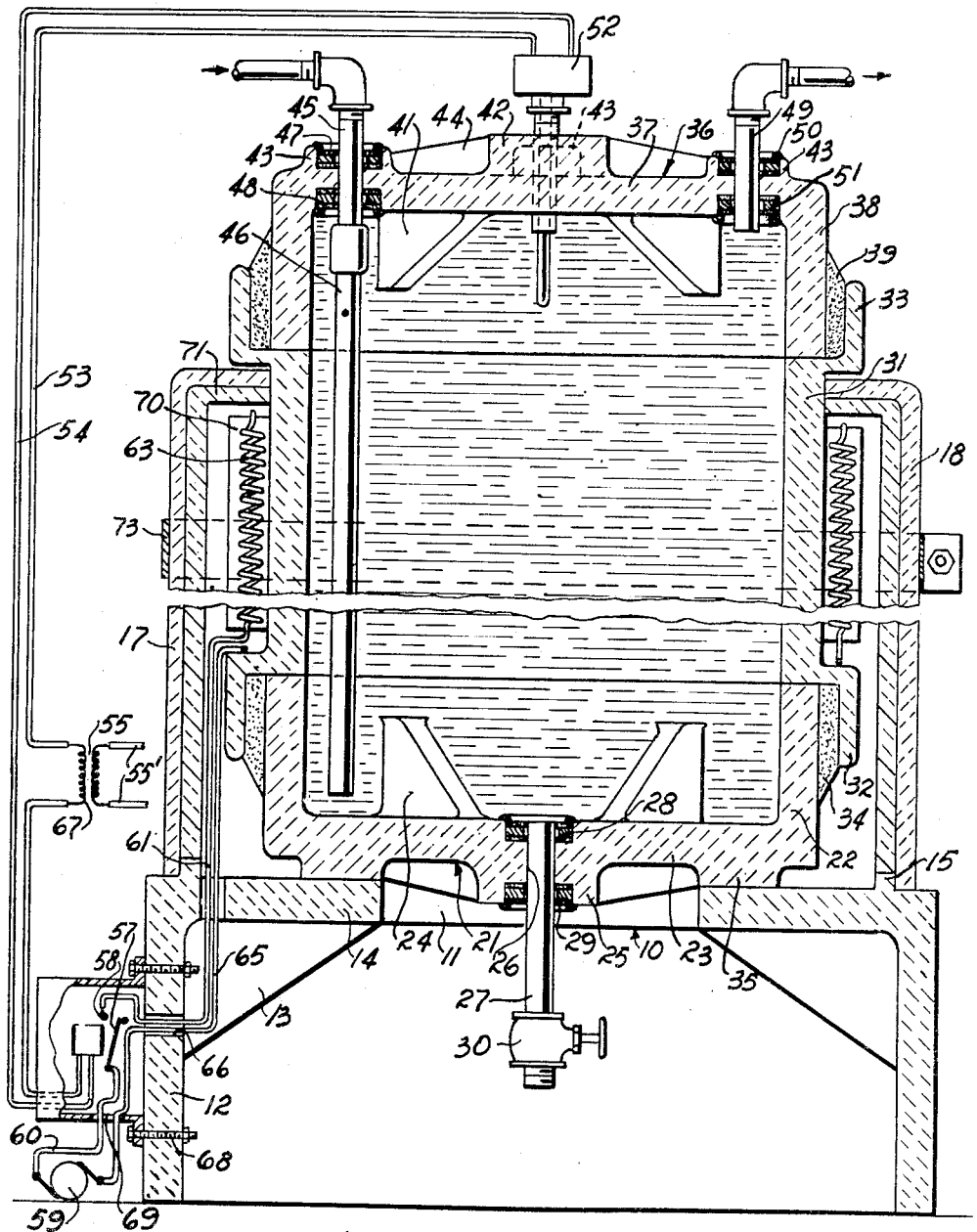
Figure 1 is a vertical sectional view of the electric hot water heater and storage tank formed of ceramic material and embodying the features of the present invention.

Referring now to the figures, 10 represents a base member generally of square shape in plan and having a large central opening 11 and a depending supporting wall 12 reinforced by angularly spaced gussets 13 extending from the wall to the underside of the top portion 14 in which the opening 11 is disposed. The top portion 14 has an annular projection 15 that serves as a guide for outer casing parts 16, 17, 18 and 19. This base member 10 is made of ceramic material.

Resting upon the top portion 14 of the base member 10 is a bottom header 21 having an upstanding cylindrical wall portion 22 and a bottom portion 23. This bottom header 21 is also made of ceramic material and is reinforced by angularly-spaced angle gusset formations 24 extending between the bottom and the cylindrical portion.

The bottom 23 is centrally thickened as indicated at 25 and has a hole 26 therein downwardly through which extends a drain pipe 27 that is sealed within the opening 26 by packing glands 28 and 29. The lower end of the drain pipe has a valve 30 to close or open the drain pipe 27. Access to the valve may be had through an opening, not shown, in the wall 12 of the base member 10.

Supported from the bottom header 21 is a cylindrical casing 31 of ceramic material having a radially offset bottom flange 32 and a radially offset top flange 33. The bottom of the cylinder 31 rests on the top edge of the cylindrical portion 22 of the bottom header 21. Between the flange 32 and the outer surface of the cylindrical portion 22 is a cylindrical formation of cement as indicated at 34 that serves to seal off the connection of the lower end of the cylinder 31 with the bottom header 21. The bottom portion 23 of the bottom header 21 has angularly-spaced round pads 35.

Within the top flange 33 of the cylindrical member 31 there is connected an upper header 36 having a top portion 37 and a depending cylindrical portion 38 that fits within the flange 33 and is sealed therein in a water-tight manner by sealing cement 39. The upper header 36 is generally of the same shape as the lower header 21 and is also formed of ceramic material and may be formed in the same mold as the lower header 21. This upper header 36 is reinforced by angle gusset formations 41 on the inner side thereof and angularly spaced relative to one another and a raised center portion 42 with angularly-spaced bosses 43 therearound. Gusset formations 44 extend from the center portion 42 to the boss portions 43.

Downwardly through one of the boss portions 43 there extends a water pipe 45 that has an extension 46 thereon to deliver the inlet water to the bottom of the tank. Packing glands 47 and 48 prevent leakage of water under pressure from the tank and along the inlet pipe 45.

Diagonally opposite from the inlet pipe 45 is an outlet pipe 49 that extends downwardly through another boss portion 43. This pipe is sealed off by packing glands 50 and 51. Extending downwardly through another boss portion 43 is a thermostat assembly 52 having wires 53 and 54 leading to a supply transformer 55 of a step-down type with primary source wires 55' and a relay coil 56 having an armature 57 adapted, when the coil 56 is energized, to engage contact 58 to close a main circuit, including an electric source 59, wire 60, armature 57, contact 58, wire 61, upper bus bar 62, a plurality of heating elements 63, a lower bus bar 64 and wires 65 connected to the source 59 in the cylindrical wall 12 of the base member 10. A housing 67 contains the relay 56 and is connected by bolts 68 to the wall 12 and about the opening 66. Wires 60, 65 extend through a hole in the bottom of the housing 67 between which the heating elements are separated from the fins 70 and through the wall material of the cylindrical member 31. The cylindrical member 31, like the headers 21, and 36, are of glazed ceramic material and cannot rust.

The outer casing members 16, 17, 18 and 19 are also of ceramic material and are lined with asbestos 71 to provide a fireproof and insulating layer and these outer casing members serve to retain the heat in the spaces surrounding the heater elements so that a maximum amount of heat will be delivered to the storage tank to heat the water within the same.

These casing parts 16, 17, 18 and 19 are removable and are releasably held about the tank parts by a band 73 located adjacent the upper end of the casing parts and by radially adjustable bolts 74 extending through slots 75 at the corners of the top portion 14 of the base 10 and held in their adjusted positions by fastening nuts 76, Fig. 3. These casing parts are forced against the outer periphery of the annular guide projection 15 and are thus held thereagainst by the releasable bolts 74. Access can be had to the nuts 76 by an opening, not shown, in the wall 12. It can thus be seen that should the heating elements 63 need to be replaced, the casing parts, four in number, can be readily removed.

In another boss portion 43 there is located and fixed a safety valve 77, Fig. 2.

It should now be apparent that there has been provided a hot water heater and storage tank which is formed wholly of ceramic material, except for the pipes, control elements and heating elements and which can be built up of a minimum number of parts and which is self-insulated, both electrically and heat-wise. It will also be apparent that easy access can be had to the heating elements for the purpose of repair and that the heating elements are well contained and adjacent to the cylindrical wall so that maximum heat is transmitted to the wall and to the interior of the same to heat the water. It will also be apparent that minimum sealing means is had with an arrangement of this type. The parts can be shipped and easily assembled at the place where the tank is to be installed.

While various changes may be made in the detail construction, it shall be understood that such changes shall be within the spirit and scope of the present invention as defined by the appended claims.

What is claimed is:

1. An electric water heater and storage tank comprising a base member, a bottom header member supported on said base member, a cylindrical member having a water-tight connection with said bottom header, an upper header having a water-tight connection with the upper end of said cylindrical member, said headers and cylindrical member being of ceramic material, an electric heating system arranged upon the outer surface of said cylindrical member, casing members supported on the base member and surrounding the cylindrical member and the heating units, and inlet and outlet water pipes leading water into and out of said tank, said inlet and outlet water pipes being contained in one of said headers, said cylindrical member having radially offset cylindrical flanges adapted to surround the header members and radially offset therefrom to provide annular spaces therearound and sealing material disposed in the annular spaces between the outer surfaces of the header member and said cylindrical flanges.

2. An electric water heater and storage tank comprising a base member, a bottom header member supported on said base member, a cylindrical member having a water-tight connection with said bottom header, an upper header having a water-tight connection with the upper end of said cylindrical member, said headers and cylindrical member being of ceramic material, an electric heating system arranged upon the outer surface of said cylindrical member, casing members supported on the base member and surrounding the cylindrical member and the heating units, and inlet and outlet water pipes leading water into and out of said tank, said inlet and outlet water pipes being contained in one of said headers, said cylindrical member having a plurality of vertically extending fins and the heating elements of said heating system being respectively disposed between said fins in the spaces thereof, said fins being spaced from one another and extending substantially the full length of the cylindrical member.

3. An electric water heater and storage tank comprising a base member, a bottom header member supported on said base member, a cylindrical member having a water-tight connection with said bottom header, an upper header having a water-tight connection with the upper end of said cylindrical member, said headers and cylindrical member being of ceramic material, an electric heating system arranged upon the outer surface of said cylindrical member, casing members supported on the base member and surrounding the cylindrical member and the heating units, and inlet and outlet water pipes leading water into and out of said tank, said inlet and outlet water pipes being contained in one of said headers, said outer casing members being formed of ceramic material and adapted to be supported on said base member, said base member having a stop projection, and radially adjustable retaining members adapted to hold said casing members against said stop projection and to be tightened in its radially adjusted position upon said base member.

4. An electric hot water heater and storage tank as defined in claim 3, said retaining means comprising a bolt, said base having a top portion and a radially extending elongated slot, said bolt extending through said slot and a nut for holding said bolt in a position along said slot.

5. An electric water heater and storage tank comprising a base member, a bottom header member supported on said base member, a cylindrical member having a water-tight connection with said bottom header, an upper header having a water-tight connection with the upper end of said cylindrical member, said headers and cylindrical member being of ceramic material, an electric heating system arranged upon the outer surface of said cylindrical member, casing members supported on the base member and surrounding the cylindrical member and the heating units, and inlet and outlet water pipes leading water into and out of said tank, said inlet and outlet water pipes being contained in one of said headers, said header members having angularly spaced boss portions thereon, the boss portions of the bottom header resting on the top of the base member and the boss portions on the upper header having openings through which said inlet and outlet pipes may extend.

6. An electric hot water heater and storage tank as defined in claim 5, and said bottom header having a central boss portion and a drain pipe extending downwardly through the central boss portion and having a valve thereon, said base member having a central opening into which said central boss extends and through which the drain pipe depends.

References Cited in the file of this patent
UNITED STATES PATENTS

| 1,630,909 | Steere | May 31, 1927 |
| 2,237,110 | Osterheld | Apr. 1, 1941 |

FOREIGN PATENTS

| 882,521 | France | Mar. 1, 1943 |